(12) United States Patent
Brecht et al.

(10) Patent No.: US 9,656,581 B2
(45) Date of Patent: May 23, 2017

(54) COMPACT BODY SUPPORT APPARATUS

(71) Applicant: JetComfy, LLC, San Diego, CA (US)

(72) Inventors: David J. Brecht, San Diego, CA (US); Ephraim Zlotnitsky, Rockville, MD (US)

(73) Assignee: JetComfy, LLC, San Diego, CA (US)

( * ) Notice: Subject to any disclaimer, the term of this patent is extended or adjusted under 35 U.S.C. 154(b) by 0 days.

(21) Appl. No.: 14/875,042

(22) Filed: Oct. 5, 2015

(65) Prior Publication Data
US 2016/0101716 A1    Apr. 14, 2016

Related U.S. Application Data

(60) Provisional application No. 62/061,991, filed on Oct. 9, 2014.

(51) Int. Cl.
*B60N 2/48* (2006.01)
*B64D 11/06* (2006.01)
*B61D 33/00* (2006.01)

(52) U.S. Cl.
CPC ........... *B60N 2/4879* (2013.01); *B60N 2/487* (2013.01); *B60N 2/4876* (2013.01); *B61D 33/005* (2013.01); *B64D 11/0646* (2014.12)

(58) Field of Classification Search
CPC .... B60N 2/4879; B60N 2/487; B60N 2/4876; B61D 33/005; B64D 11/0646
USPC ...... 297/397, 405, 392, 411.24, 411.38, 399, 297/411.23; 248/118.3, 118.5; 403/76
See application file for complete search history.

(56) References Cited

U.S. PATENT DOCUMENTS

| 256,711 | A | * | 4/1882 | Liscomb | A47C 7/40 |
| | | | | | 297/301.1 |
| 573,147 | A | * | 12/1896 | Higgins | A47C 7/38 |
| | | | | | 297/405 |
| 634,083 | A | * | 10/1899 | Gould | A47C 1/10 |
| | | | | | 297/405 |

(Continued)

FOREIGN PATENT DOCUMENTS

RU    2278032 C2    2/2006

OTHER PUBLICATIONS

Notification of Transmittal of the International Search Report and the Written Opinion of the International Searching Authority, or the Declaration dated Dec. 17, 2015; International Application No. PCT/US2015/054540; International Filing Date: Oct. 7, 2015; Applicant: Jetcomfy, LLC.

*Primary Examiner* — Milton Nelson, Jr.
(74) *Attorney, Agent, or Firm* — Erise IP, P.A.

(57) ABSTRACT

A compact body support apparatus is provided for use with an armrest of a vehicle such as an airplane, train, or bus. The compact body support apparatus comprises a base, a support post, a housing, and a headrest cushion. The support post presents a lower end secured to the base and an upper end. The housing is secured to the upper end of the support post. The headrest cushion is secured to the housing for supporting a head of a user. The compact body support apparatus is configured to be selectively placed into a collapsed position and a deployed position, such that the support post and at least a portion of the base are disposed within the housing when the compact body support apparatus is in the collapsed position and the support post extends in a generally downward direction when the compact body support apparatus is in the deployed position.

14 Claims, 16 Drawing Sheets

(56) References Cited

U.S. PATENT DOCUMENTS

| | | | | |
|---|---|---|---|---|
| 1,008,456 | A | * | 11/1911 | Etter ................... A47C 3/021 297/286 |
| 5,332,287 | A | * | 7/1994 | Whitmyer .............. A47C 7/38 297/405 |
| 9,150,130 | B2 | * | 10/2015 | Jackow ................ B60N 2/4805 |
| 2002/0033628 | A1 | * | 3/2002 | Clough ................. A47C 7/38 297/410 |
| 2006/0244300 | A1 | | 11/2006 | Watson Savage |
| 2012/0261965 | A1 | | 10/2012 | Elizalde |

\* cited by examiner

COMPACT BODY SUPPORT APPARATUS

RELATED APPLICATIONS

This non-provisional patent application claims priority benefit, with regard to all common subject matter, of earlier-filed U.S. Provisional Patent Application No. 62/061,991, filed on Oct. 9, 2014, and entitled "COMPACT HEAD SUPPORT APPARATUS." The identified earlier-filed provisional patent application is hereby incorporated by reference in its entirety into the present application.

BACKGROUND

1. Field

Embodiments of the invention are directed towards a personal pillow particularly suited for use on a transportation vehicle. More specifically, embodiments of the invention are directed to a compact, foldable head support apparatus for use on an airplane, train, bus, or other vehicle.

2. Related Art

There exists a need for more comfortable resting and sleeping positions while sitting in a vehicle, such as in airline, train, or bus seats. Typically, these seats provide little to no support for patrons attempting to sleep in them. These seats will include a seat back, a seat bottom, a seat headrest, and at least one armrest. Various devices and cushions have attempted to solve this problem, but with limited results.

Most personal cushions include several problems. First, these personal cushions rely on the user to lean against an existing part of the vehicle, such as a seat headrest, a wall of the vehicle, or a back side of the seat in front of them. None of these existing locations is at a comfortable position and angle for sleeping. Second, these personal cushions are not customizable. Every person enjoys sleeping at a different angle or position, and the desired angle can change during a single flight. Third, many of these personal cushions are inconvenient for neighboring passengers. Fourth, many of these personal cushions are difficult to carry onto and off of the vehicle, due to a bulky nature. Finally, many of these personal cushions are difficult to set up and employ.

SUMMARY

Embodiments of the invention solve the above-mentioned problems by providing a compact body support apparatus. The compact body support apparatus provides a support for the user to rest on in a more natural position than existing personal cushions. A comfortable and natural resting position is to rest one's head upon their hand, while the elbow is used as a support on the armrest. However, this position is likely to cause discomfort in the elbow, arm, or hand of the passenger. Embodiments of the invention seek to imitate this natural resting position with a mechanical device while providing a more comfortable resting position. The compact body support apparatus is fully customizable, including in adjusting the height, adjusting the angle of the support, adjusting the angle of the cushion relative to the support, etc. The compact body support apparatus also provides minimal inconvenience to neighboring passengers by utilizing only a small portion of the armrest, such that the neighboring passenger can utilize the remainder of the armrest if desired. The compact body support apparatus easily and conveniently collapses at least partially within itself such that it presents a minimal profile in a collapsed position. In the collapsed position, the compact body support apparatus is conveniently sized to fit in the hand or bag of the user.

A first embodiment of the invention is directed to a compact body support apparatus comprising a base, a support post, a housing, and a headrest cushion. The base is configured to interface with a seat of a vehicle. The support post presents a lower end secured to the base and an upper end. The housing is secured to the upper end of the support post. The headrest cushion is secured to the housing for supporting a body part of a user. The compact body support apparatus is configured to be selectively placed into a collapsed position and a deployed position, such that the support post and at least a portion of the base are disposed within the housing when the compact body support apparatus is in the collapsed position and the support post extends in a generally downward direction when the compact body support apparatus is in the deployed position. The upper end of the support post is disposed in a first location of the housing when in the collapsed position and disposed in a second location of the housing when in the deployed position.

A second embodiment of the invention is directed to a compact body support apparatus comprising a base, a support post, a housing, and a headrest cushion. The base is configured to interface with an armrest of a vehicle and presents a general L-shape that is generally complementary to a shape presented by the armrest. The support post presents a lower end pivotably secured to the base and an upper end. The housing is secured to the upper end of the support post. The headrest cushion is secured to the housing for supporting a head of a user.

A third embodiment of the invention is directed to a method of mounting upon a compact body support apparatus, the method comprising the following steps: acquiring a compact body support apparatus including a base, a support post, a housing, and a headrest cushion, wherein the compact body support apparatus is disposed in a collapsed position such that the support post and a least a portion of the base are disposed within the housing; grasping the base of the compact body support apparatus; pulling the base away from the housing, such that the support post secured thereto pivots out of the housing; continuing to pull the base away from the housing until the compact body support apparatus is in a deployed position; placing the base against an armrest; adjusting a length presented by the support post to a desired length; and resting against the headrest cushion disposed on the housing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
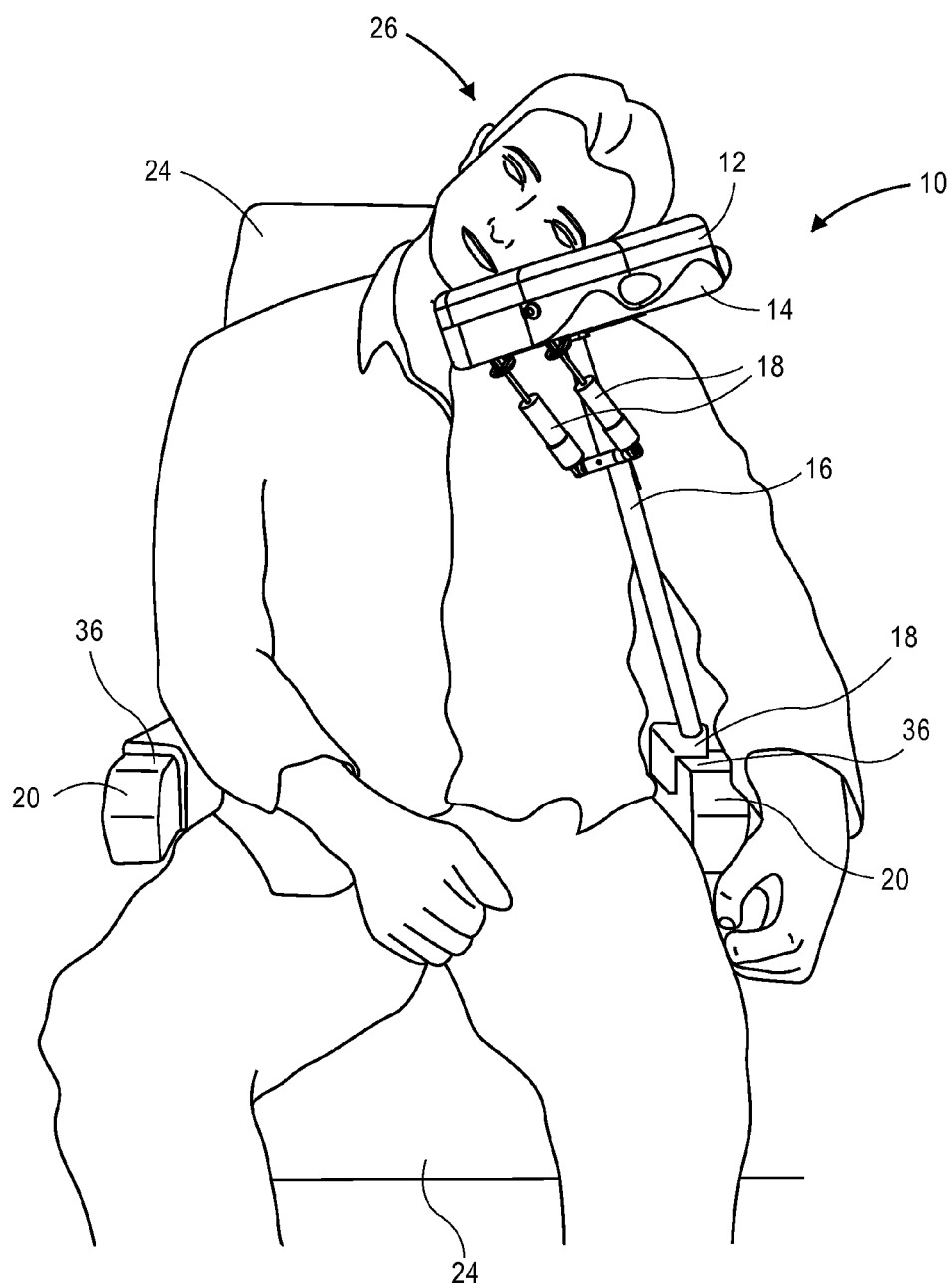
FIG. 1 is an environmental view depicting a user using a compact body support apparatus.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 9:
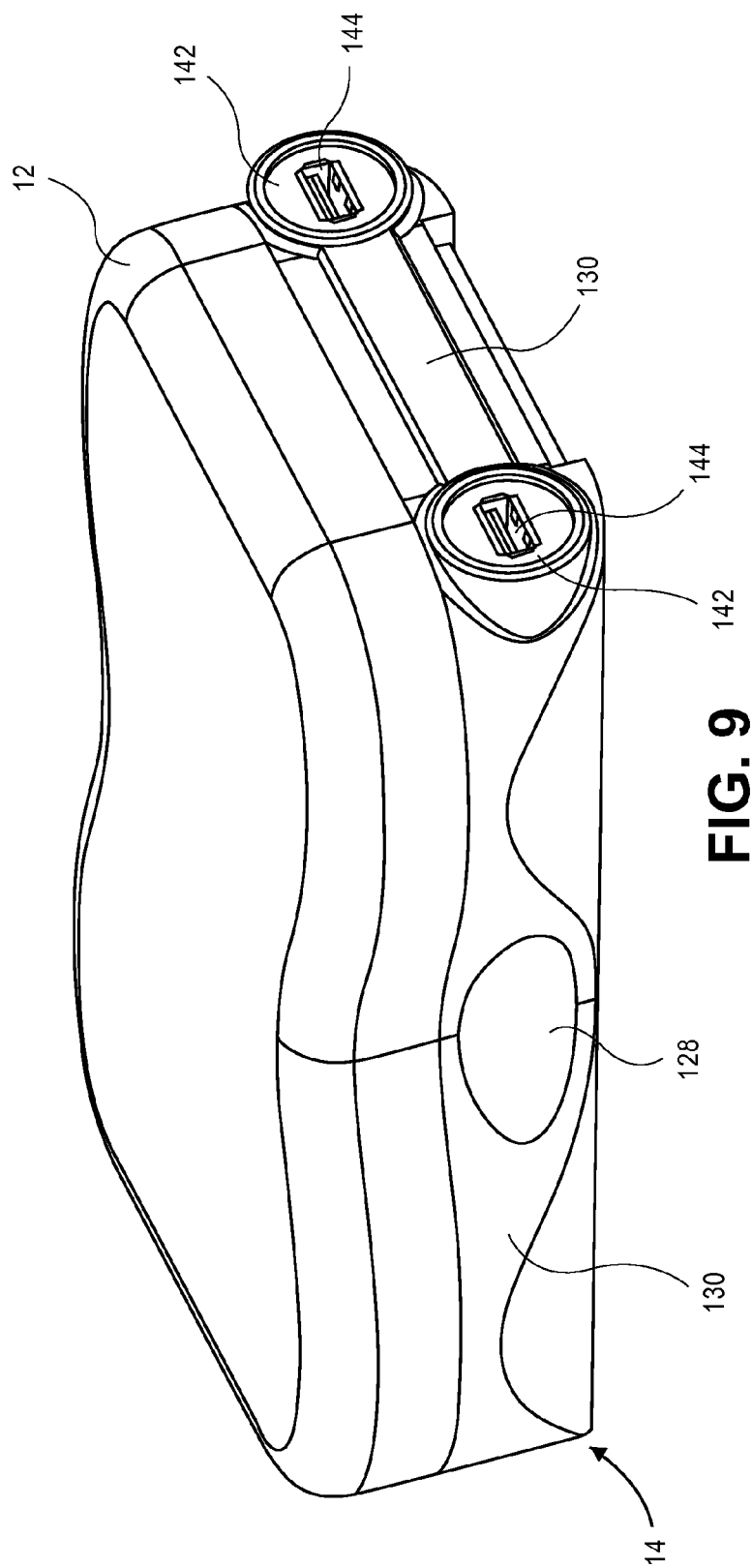
FIG. 9 is a perspective top view of the compact body support apparatus, disposed in a collapsed position.
Figure 10:
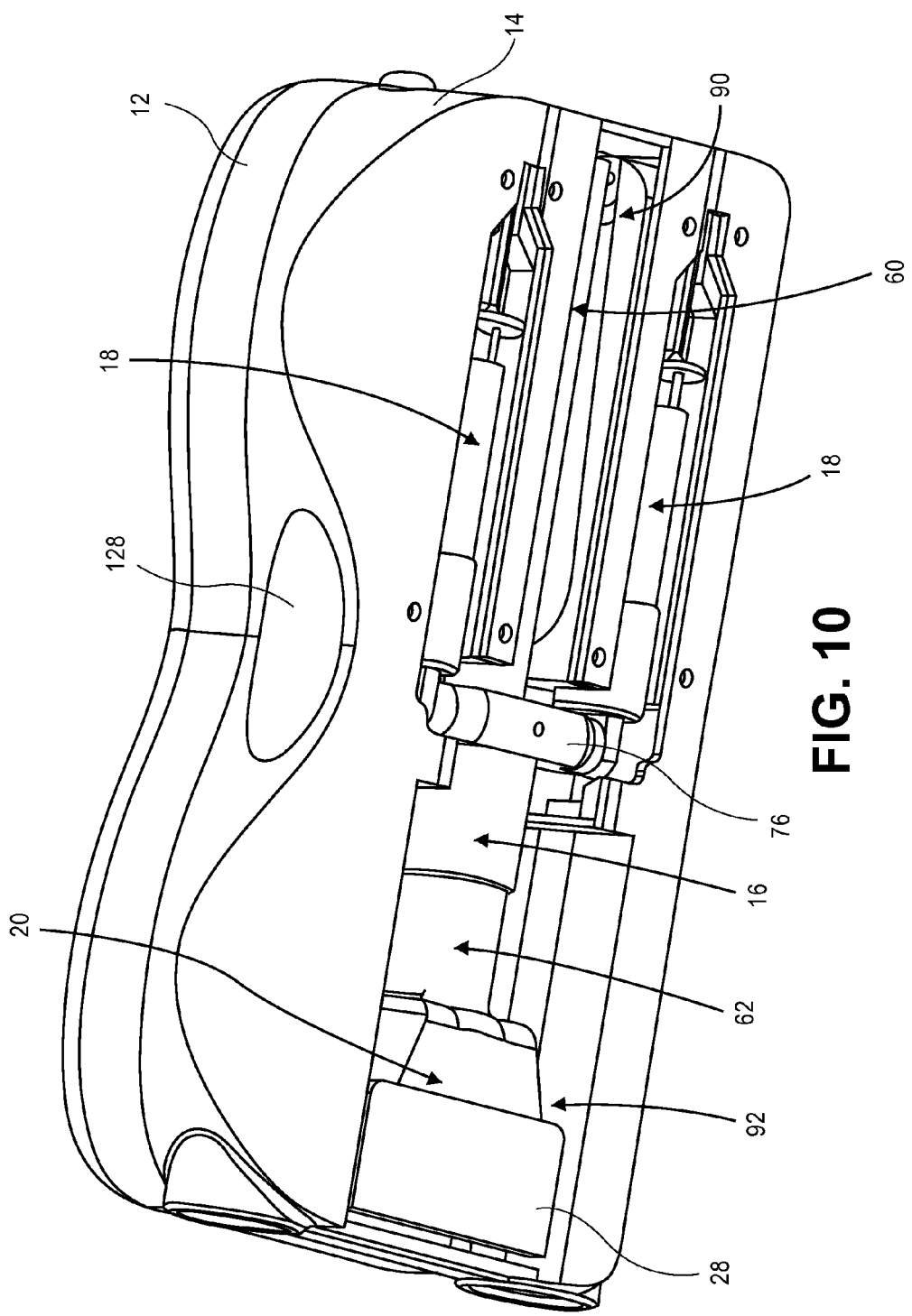
FIG. 10 is a perspective bottom view of the compact body support apparatus.

As illustrated in FIG. 1, a compact body support apparatus 10 of embodiments of the invention broadly comprises a headrest cushion 12, a housing 14, a support post 16, at least one stabilizing post 18, and a base 20. The compact body support apparatus 10 is configured to be selectively emplaced into a deployed position (as illustrated in FIGS. 1-5) and a collapsed position (as illustrated in FIGS. 9-10). In the deployed position, the compact body support apparatus 10 is configured to be emplaced upon (and/or secured to) an armrest 22 of a seat 24 in a vehicle in which the user 26 is riding as a passenger, as illustrated in FIG. 1. In the collapsed position, the compact body support apparatus 10 is configured to be grasped by the user 26 for storage and transportation.

As illustrated in FIG. 1, when in the deployed position the compact body support apparatus 10 serves to provide a comfortable resting device for the user 26. The user 26 places the base 20 against the armrest 22 of the seat 24 or against another surface. The user 26 then orients the support post 16 toward their head or other body part. As further described below, the compact body support apparatus 10 can be customized to support the headrest cushion 12 at a desired height and angle. The user 26 then orients the headrest cushion 12 and the housing 14 in a desired orientation. The user 26 then places their head, face, neck, shoulder, etc. against the headrest cushion 12. The stabilizing posts 18 then compress to allow the housing 14 (and by extension the headrest cushion 12 secured thereto) to pivot relative to the support post 16. This allows the compact body support apparatus 10 to conform to a shape presented by the user 26, as illustrated in FIG. 1. The stabilizing posts 18 also provide shock absorption and customizable angles of the housing 14 and headrest cushion 12.

As illustrated in FIGS. 9-10, when in the collapsed position the compact body support apparatus 10 presents a compact, easy-to-carry shape. In the collapsed position, the support post 16, the stabilizing posts 18, and the base 20 are disposed at least partially within the housing 14. The support post 16 is secured in the shortest (or substantially shortest) length. The stabilizing posts 18 are substantially parallel to the support post 16.

The user 26 manipulates the compact body support apparatus 10 to move the compact body support apparatus 10 between the collapsed position and the deployed position. From the collapsed position, the user 26 grasps the base 20 and/or support post 16. The user 26 then pulls the base 20 and/or support post 16 away from the housing 14 in which it is stored. As the user 26 pulls the base 20 and/or support post 16, the support post 16 pivots outward and moves laterally along a portion of the housing from a first location to a second location (discussed below). As the user 26 pulls the base 20 and/or support post 16, the stabilizing posts 18 pivot outward. Eventually, as the user 26 continues to pull the base 20 and/or support post 16, the user 26 will reach the deployed position. The user 26 may then optionally secure the base 20 to the armrest 22 or other surface to provide additional stability.

The components of the compact body support apparatus 10 will now be discussed in depth. As discussed above, the compact body support apparatus 10 includes the base 20, the support post 16, the stabilizing posts 18, the headrest cushion 12, and the housing 14. The headrest cushion 12 is secured to the housing 14 and oriented upwards. The support post 16, the stabilizing posts 18, and the base 20 are secured within the housing 14 and configured to be oriented generally downward.

Figure 3:
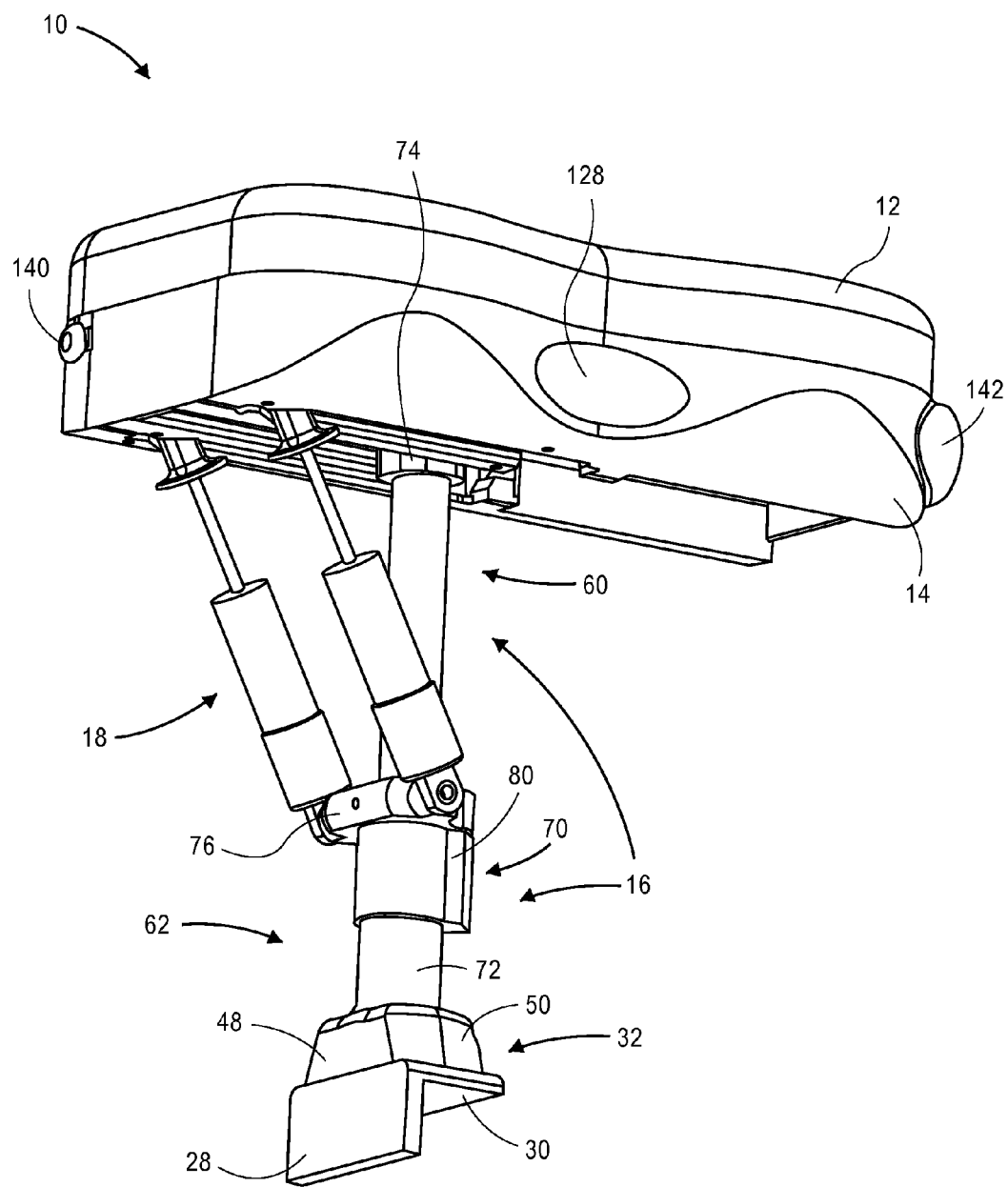
FIG. 3 is a perspective view from a first side of a post-storage end of the compact body support apparatus, disposed in a deployed position.
Figure 4:
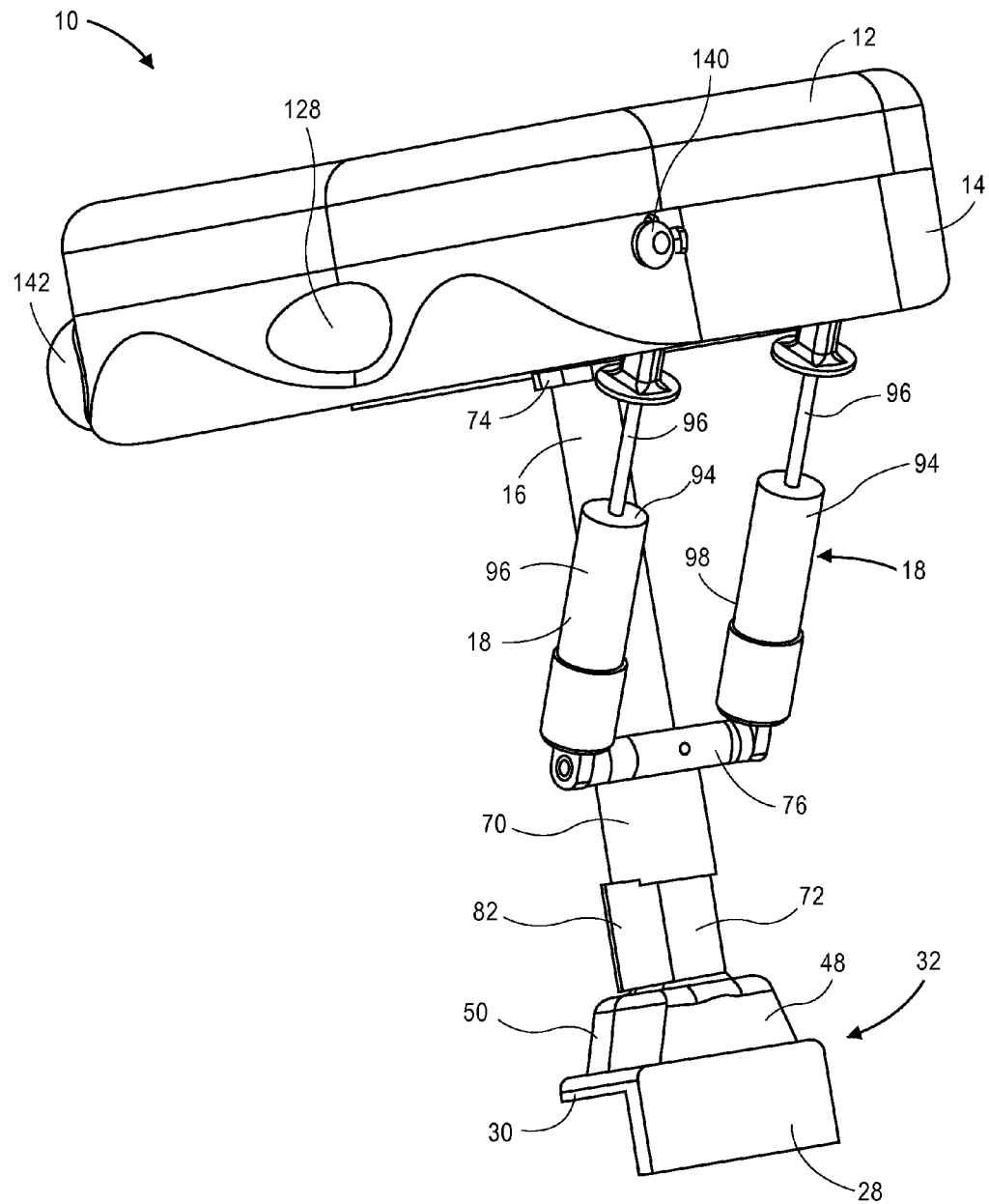
FIG. 4 is a perspective view from a second side of the post-storage end of the compact body support apparatus.
Figure 5:
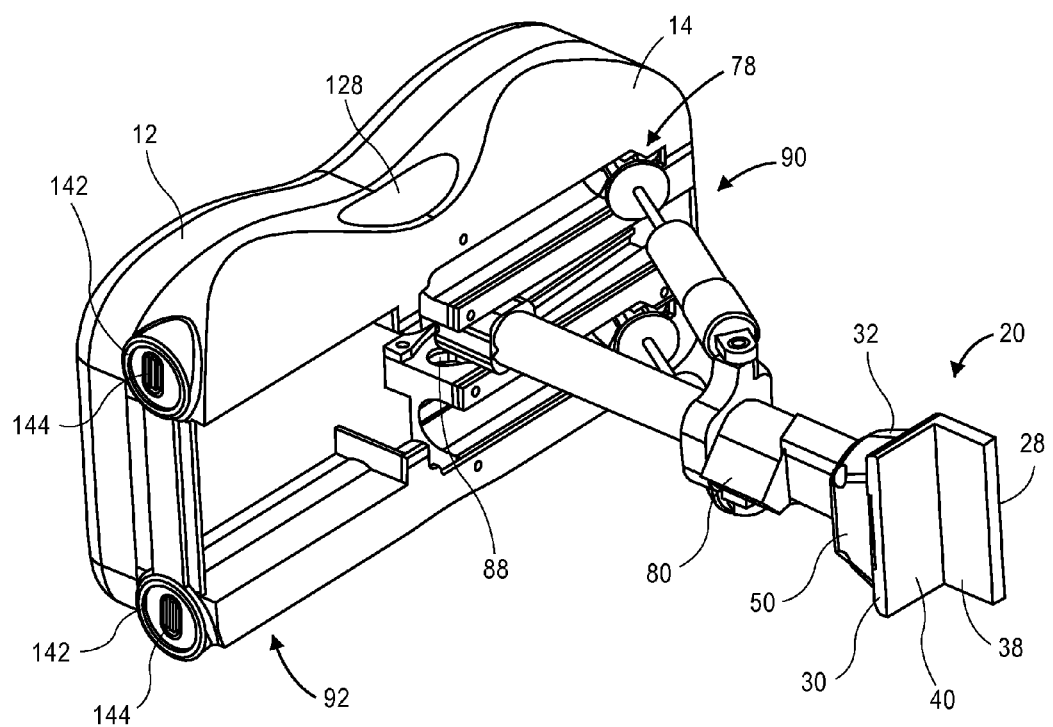
FIG. 5 is a perspective view from below a base storage end of the compact body support apparatus.

As illustrated in FIGS. 3-4, in embodiments of the invention, the base 20 presents a general L-shape. The base 20 comprises a vertical segment 28, a horizontal segment 30, and a support-post interface 32. The vertical segment 28 is joined with the horizontal segment 30 at an approximately 90 degree angle. The support-post interface 32 is disposed on the horizontal portion and oriented generally upward. The support post 16 is secured to, or partially within, the support-post interface 32. In some embodiments, the base 20 further comprises an armrest lock 34. The armrest lock 34 allows the user 26 to selectively secure the base 20 to the armrest 22 such that the compact body support apparatus 10 remains secured to the armrest 22 upon the user 26 removing contact from the compact body support apparatus 10. The armrest lock 34 also helps keep the compact body support apparatus 10 oriented generally upward and prevents slippage of the base 20 relative to the armrest 22.

Figure 2:
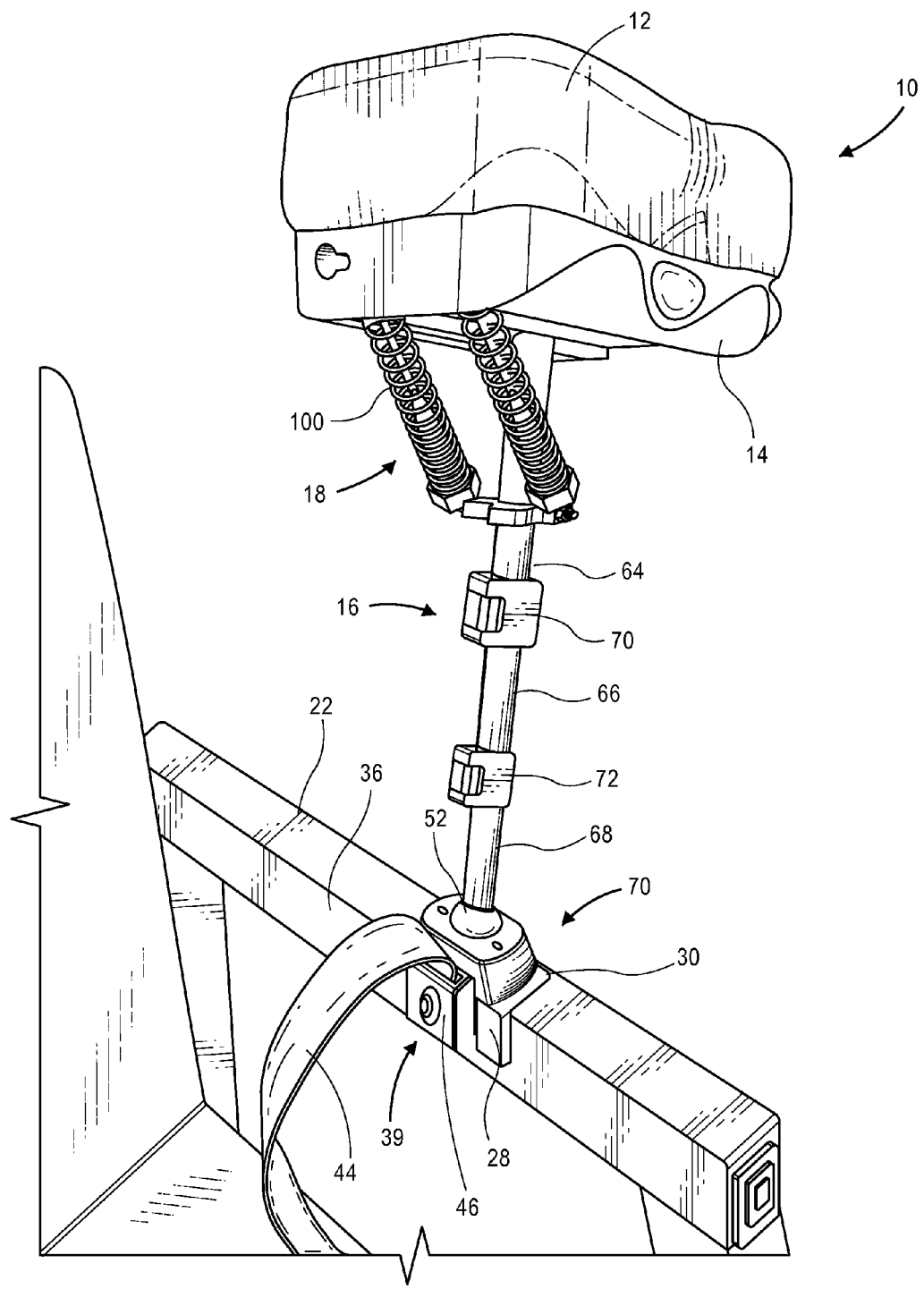
FIG. 2 is an environmental view depicting the compact body support apparatus secured to an armrest.

Most seats, particularly seats of an airplane, train, or bus, have armrests 22 with a substantially flat top and present a square or rectangular shape about a vertical cross-section. This fairly standardized shape of armrests 22 provides a substantially complementary shape for the base 20. The L-shape formed of the vertical segment 28 and the horizontal segment 30 of the base 20 are configured to rest on a corner 36 of the armrest 22, as illustrated in FIGS. 1 and 2. Furthermore, the L-shaped base 20 is an advantageous choice for transferring the force of the user 26 resting their head on the apparatus to the armrest 22 to promote the support and stability of the compact body support apparatus 10. These armrests 22 are also typically quite stable so as to provide for the above-discussed support.

In other embodiments of the invention, the compact body support apparatus 10 is configured to be placed against, and be supported by, another component of the vehicle. In one embodiment of the invention, the base 20 is configured to rest against a tray table of the seat in front of the seat 24 in which the user 26 is sitting (i.e. that is in a lowered position). In yet another embodiment of the invention, the base 20 is configured to rest against the floor of the vehicle, such as via a tripod-configured base. In still another embodiment of the invention, the base 20 is configured to rest against a seat cushion of the seat 24, such as between the legs of the seated user.

When the user 26 is seated in the seat 24, an angle can be defined from a corner 36 of the armrest 22 between a horizontal plane across the top of the armrests 22 and the passenger's desired head position. If the user 26 was to rest their head such as illustrated in FIG. 1, components of the moment of force from supporting the passenger's head would be directed down upon and outwards through the armrest 22, supporting the structure in both directions. This lends itself well to the construction of the L-shaped base 20, as the force from the passenger's head is directed into the stable armrest 22.

Figure 11:
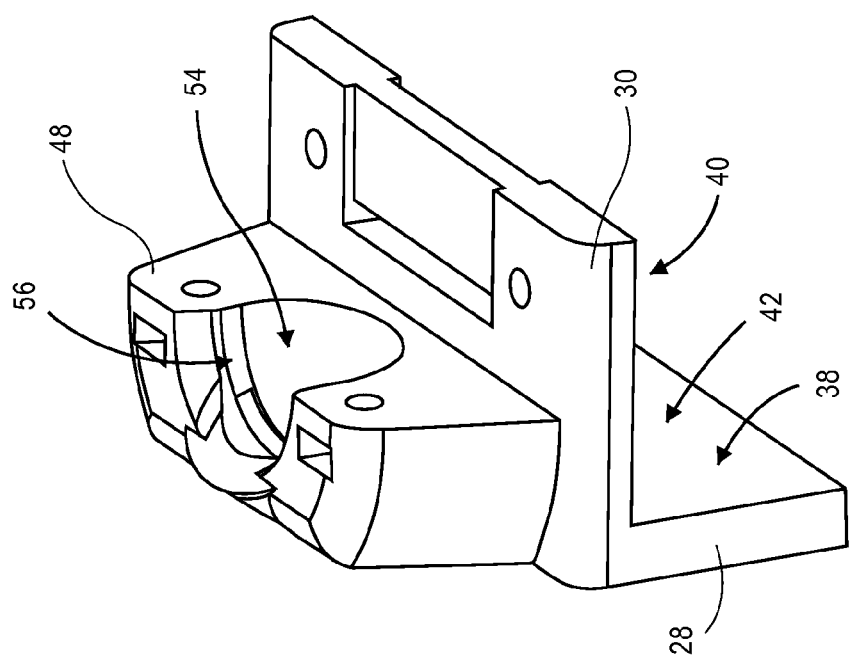
FIG. 11 is a perspective view of one embodiment of a base of the compact body support apparatus, with a second ball-joint interface removed for clarity.
Figure 13:
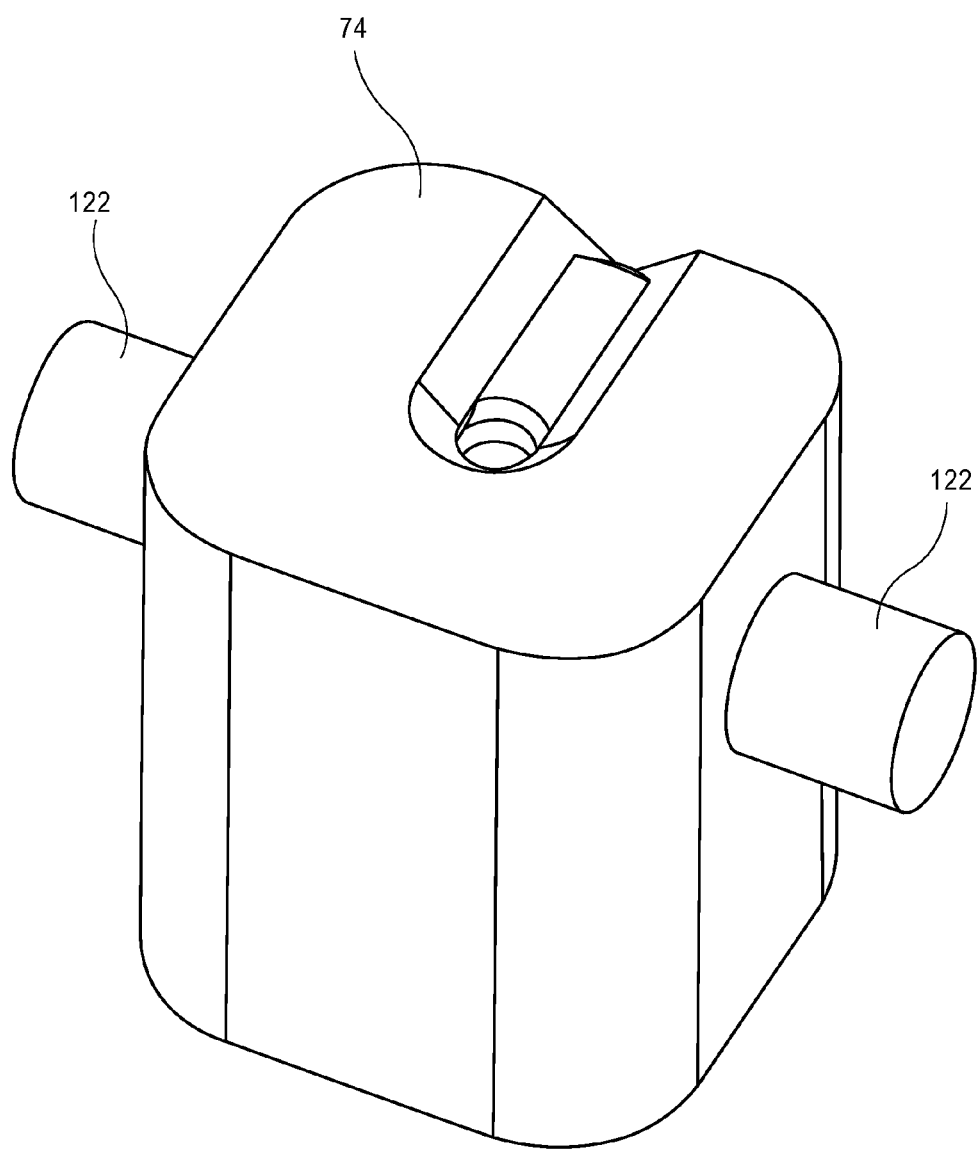
FIG. 13 is a perspective view of a head segment of the support post.
Figure 14:
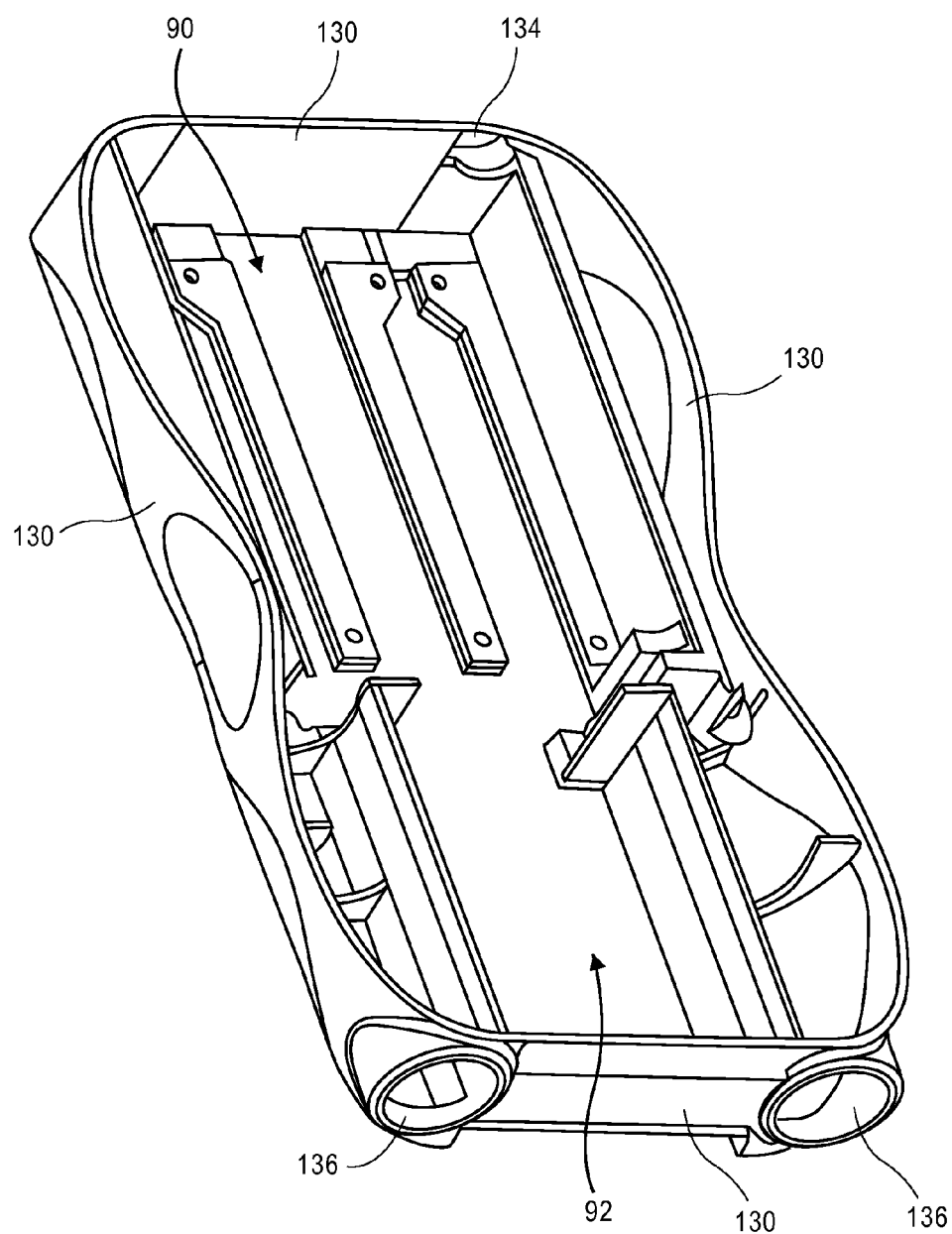
FIG. 14 is a perspective view of a housing of the compact body support apparatus.
Figure 15:
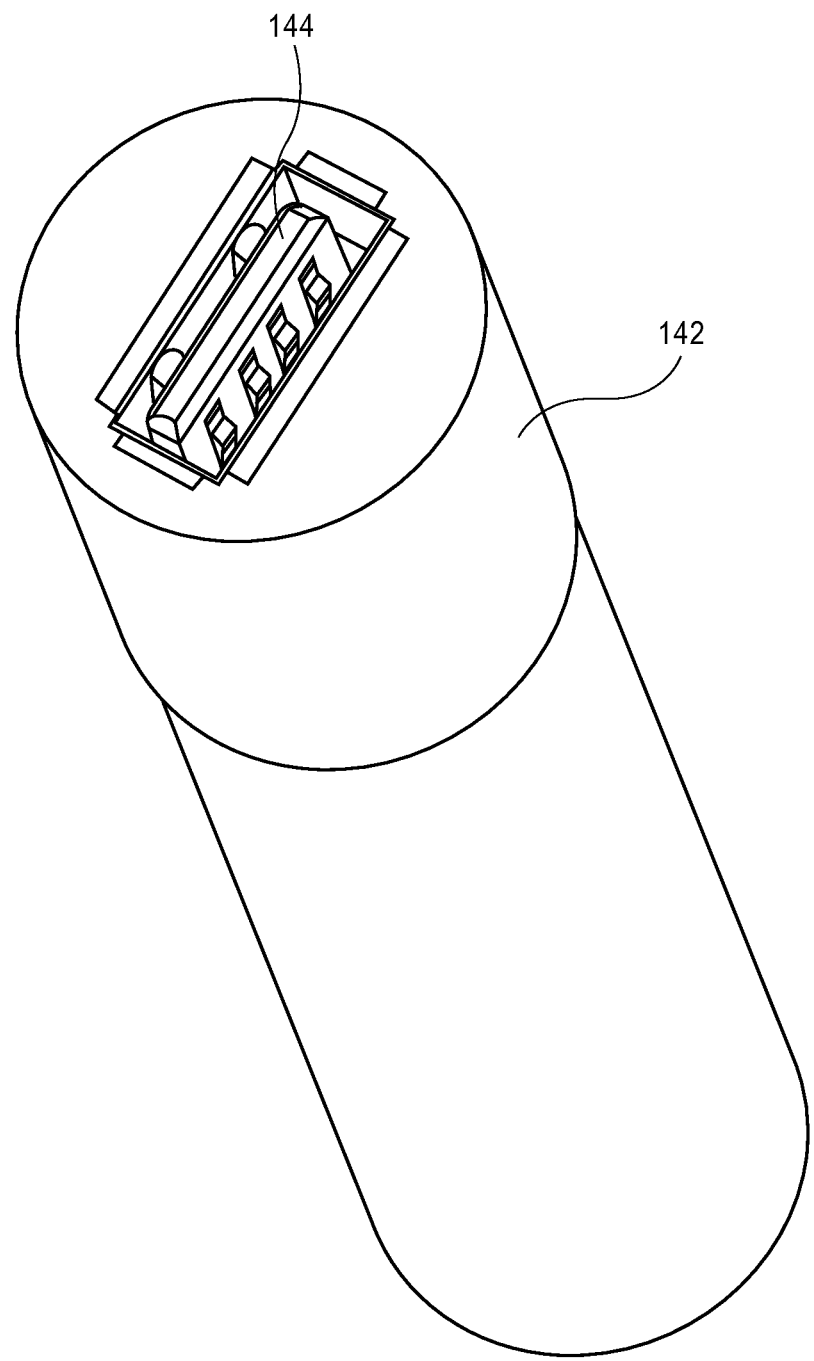
FIG. 15 is a perspective view of a battery pack.

In embodiments of the invention, an interfacing side 38 of the vertical segment 28 and an interfacing side 40 of the horizontal segment 30 present a friction-inducing segment 42, as illustrated in FIG. 11. The friction-inducing segment 42 increases the friction between the base 20 and the armrest 22. The interfacing sides 38, 40 of each portion of the L-shaped base 20 may be textured and/or lined with a nonslip material to increase the coefficient of friction between the L-shaped base 20 and the armrest 22.

In embodiments of the invention, the L-shaped base 20 could remain planted to the armrest 22 without any attachment device so long as the passenger's head was continuously supplying force outwards upon the cushion. However, to avoid the compact body support apparatus 10 falling if and when the downward force of the head is removed, in some embodiments the armrest lock 34 is provided. In some embodiments of the invention, the armrest lock 34 includes a belt 44 and a buckle 46. In other embodiments, the armrest lock 34 includes an elastic band, a nylon strap, or cinching buckle. In some embodiments, the armrest lock 34 may comprise magnetic components for magnetically attracting to a metal armrest.

In addition or alternatively, the armrest lock 34 may include an opening in the base 20 to allow a bolt or other fastener to be secured to the armrest 22 of the seat 24. If the seat 24 was designed with a receiver, the compact body support apparatus 10 could be attached directly to the armrest 22 (and the L-shape presented by the base 20 may not be utilized).

Figure 12:
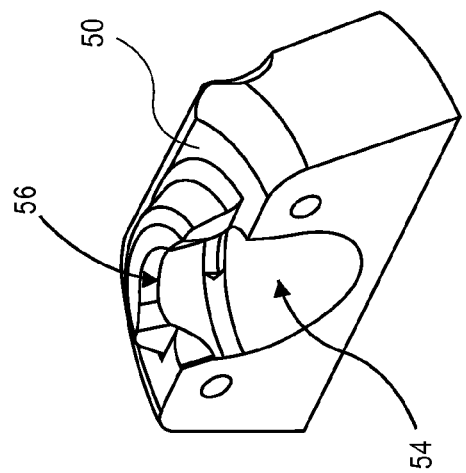
FIG. 12 is a perspective view of the second ball-joint interface that would be added around a ball joint to pivotably secure a support post to the base.

In some embodiments, the support-post interface 32 of the base 20 includes a first ball-joint receiver 48 and a second ball-joint receiver 50, as illustrated in FIGS. 11 and 12. In embodiments of the invention, the first ball-joint receiver 48 is a monolithic component of the base 20 and the second ball-joint receiver 50 is a separate component of the base 20. A ball joint 52 of the support post 16 is inserted into a void 54 of the first ball-joint receiver 48. The second ball-joint receiver 50 is then placer around the ball joint 52 of the support post 16 and adjacent to the first ball-joint receiver 48 and the horizontal segment 30 of the base 20. The second ball-joint receiver 50 is then secured to the base 20 such that the ball joint 52 of the support post 16 is retained therein.

The ball joint 52 of the support post 16 allows the support post 16 to pivot relative to the base 20. A typical ball joint 52 will allow the support post 16 (and by extension the housing 14 and headrest cushion 12 secured thereto) to pivot along all three rotational degrees of freedom. This allows the user 26 to pivot the compact body support apparatus 10 in a forward-backward direction, in a left-right direction, and about the post (typically referred to as yaw, roll, and pitch in the areal vehicle context). This, combined with the telescoping function of the support post 16 discussed below, allows the user 26 to place the headrest cushion 12 at a wide variety of positions and orientations relative to the base 20. In particular, the compact body support apparatus 10 is designed to be adaptable such that it can adjust to support the head of the user 26 whether the user 26 desires to sit back in their seat 24, sit up straight, or lean forward.

The limit of travel of the support post 16 within the base 20 is typically set by a thickness presented by the support post 16. As the ball joint 52 of the support post 16 pivots within the support-post interface 32, the pivoting motion must cease upon a portion of support post 16 contacting an inner ring 56 presented by the first ball-joint receiver 48 and the second ball-joint receiver 50 of the support-post interface 32. The support post 16 may then continue to travel laterally, i.e. along the inner ring 56, or move back away from the inner ring 56, as desired by the user 26. In addition, in some embodiments of the invention, the support-post interface 32 may be tightened or loosened to add or reduce friction that holds the ball joint 52 in a given orientation.

In embodiments of the invention, a limit of travel in the forward-backward direction (i.e. along the armrest 22) may be at least 60 degrees, at least 90 degrees, or at least 120 degrees. In embodiments of the invention, a limit of travel in the left-right direction (i.e. perpendicular to the armrest 22) may be at least 60 degrees, at least 90 degrees, or at least 120 degrees. In embodiments of the invention, the limit of travel in the forward-backward direction is substantially the same as the limit of travel in the left-right direction.

Figure 17:
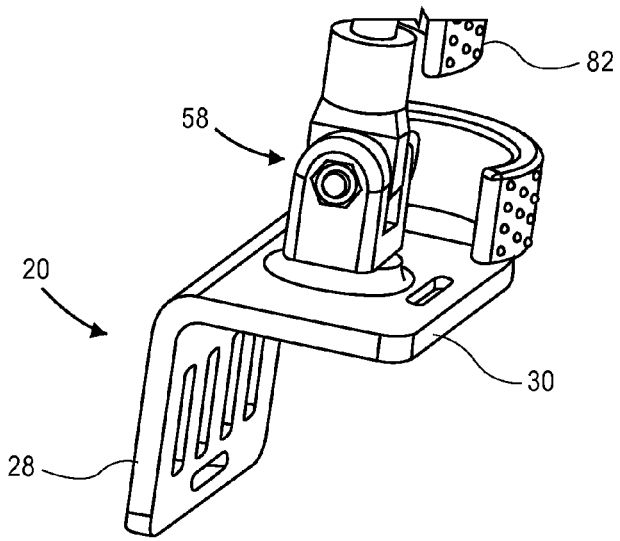
FIG. 17 is a perspective view of an alternative embodiment of the base.

In other embodiments of the invention, as illustrated in FIG. 17, the described pivoting action of the support-post interface via a swivel/radial joint 58 to connect the base 20 and the support post 16. In this embodiments, a first cam lock used to hold the L-shaped base 20 in place. Upon release, an internal spring pushes apart the two halves of the swivel/radial joint 58 allowing the base 20 of the joint to turn radially and the angle of the support post 16 relative to the L-shaped base 20 to be changed. Desired limits of travel may be incorporated into the joint, as discussed above.

The support post 16 raises the headrest cushion 12 to the desired height, as illustrated in FIGS. 1-2. The support post 16 provides support for the housing 14 and the headrest cushion 12 at an upper end 60 and is secured to the base 20 at a lower end 62. The support post 16 can be adjusted longer or shorter by the user 26 as desired. In embodiments of the invention the support post 16 comprises a static segment 64, a first telescoping segment 66, a second telescoping segment 68, an upper telescope lock 70, a lower telescope lock 72, a head segment 74, a stabilizer interface 76, and the ball joint 52. Generally, the static segment 64 is disposed at the upper end 60, the first telescoping segment 66 is disposed between the upper end 60 and the lower end 62, and the second telescoping segment 68 is disposed at the lower end 62 of the support post 16. The upper telescope lock 70 is disposed on the static segment 64 and around the first telescoping segment 66. The lower telescope lock 72 is disposed on the first telescoping segment 66 and around the second telescoping segment 68. The head segment 74 is disposed at the upper end 60 and interfaces with the housing 14, as described below. The stabilizer interface 76 provides an attachment point 78 for the at least one stabilizing post.

The first telescoping segment 66 is disposed at least partially within the static segment 64. The upper telescope lock 70 is disposed between the static segment 64 and the first telescoping segment 66 to secure the first telescoping segment 66 in a certain position relative to the static segment 64. The second telescoping segment 68 is disposed at least partially within the first telescoping segment 66. The upper telescope lock 70 is disposed between the first telescoping segment 66 and the second telescoping segment 68 to secure the second telescoping segment 68 in a certain position relative to the first telescoping segment 66. Accordingly, an outer diameter of the first telescoping segment 66 is substantially the same as or slightly smaller than an inner diameter of the static segment 64, and an outer diameter of the second telescoping segment 68 is substantially the same as or slightly smaller than an inner diameter of the first telescoping segment 66.

The static segment 64 is secured to the head segment 74, the stabilizer interface 76, and the upper telescope lock 70. The upper telescope lock 70 is secured at a lower end of the static segment 64. The upper telescope lock 70 is configured to selectively engage and disengage from the first telescoping segment 66 that is disposed therein. The head segment 74 is secured at the upper end 60 of the static segment 64 to move along the channel of the housing 14, so as to move the compact body support apparatus 10 between the collapsed position and the deployed position. The stabilizer interface 76 provides an attachment point 78 for each of the stabilizing posts.

The upper telescope lock 70 is secured around the static segment 64 to keep the first telescoping segment 66 secured in a certain position. The upper telescope lock 70 is configured to be selectively placed in a locked position and an unlocked position. When in the locked position, the upper telescope lock 70 prevents the first telescoping segment 66 from moving relative to the static segment 64. When in the unlocked position, the upper telescope lock 70 allows the first telescoping segment 66 to slide relative to the static segment 64 such that the support post 16 becomes longer and shorter (and the headrest cushion 12 becomes higher and lower, assuming the base 20 is emplaced on the armrest 22). In some embodiments the upper telescope lock 70 is changed between positions via the manipulation of a release lever 80, a rotation of the upper telescope lock 70 about the static segment 64, the pressing of a button, etc.

The first telescoping segment 66 is disposed between the static segment 64 and the second telescoping segment 68. In embodiments of the invention, the first telescoping segment 66 includes a slide assist (not illustrated). The upper telescope lock 70 is secured to a lower end of the first telescoping segment 66 and the slide assist is secured to an upper end of the first telescoping segment 66. When in the shortest length, as illustrated in FIGS. 1 and 2, the first support post 16 is not visible because it is secured entirely or mostly within the static segment 64.

The lower telescope lock 72 is secured around the first telescoping segment 66 to keep the second telescoping segment 68 secured in a certain position. The lower telescope lock 72 is configured to be selectively placed in a locked position and an unlocked position. When in the locked position, the lower telescope lock 72 prevents the second telescoping segment 68 from moving relative to the first telescoping segment 66. When in the unlocked position, the lower telescope lock 72 allows the second telescoping segment 68 to slide relative to the first telescoping segment 66 such that the support post 16 becomes longer and shorter (and the headrest cushion 12 becomes higher and lower). In some embodiments the lower telescope lock 72 is changed between positions via the manipulation of a release lever 82, a rotation of the upper telescope lock 70 about the static segment 64, the pressing of a button, etc.

The second telescoping segment 68 is disposed at least partially within the first telescoping segment 66 and secured in place by the lower telescope lock 72. The second telescoping segment 68 is secured to the ball joint 52 at a lower end.

In embodiments of the invention, the support post 16 is formed of a metal, such as stainless steel. In embodiments of the invention, the support post 16 is formed of a polymer. For example, the support post 16 may be formed of a polycarbonate by plastic extrusion process. As another example, the support post 16 may be formed by injection molding of a plastic. In some embodiments, the static segment 64, the first telescoping segment 66, and the second telescoping segment 68 are each formed of either stainless steel or a polymer, and more than one type of material is used in the support post 16.

In embodiments of the invention, two stabilizing posts 18 are utilized in the compact body support apparatus 10 to perform various functions. Before discussing these functions, it will be beneficial to the reader to define angles and directions. A housing plane is defined by a top of the housing 14 and a bottom of the headrest cushion 12. When in the collapsed position, the support post 16 and the stabilizing posts 18 are typically substantially parallel with the housing plane. When in the deployed position, the support post 16 is typically substantially perpendicular to the housing plane, and the stabilizing posts 18 are typically disposed at approximately 45 degrees from the housing plane. This is accomplished by head segment 74 of the support post 16 moving from a first location 84 to a second location 86 within a J-shaped track 88 of the housing 14 (as discussed more below and illustrated in FIG. 7) and by the stabilizing posts 18 changing a length that is presented. The housing 14 presents a post-storage end 90 and a base-storage end 92. The stabilizing posts 18 are disposed on either side of and toward the post-storage end 90 of the housing 14 and secured thereto.

First, the stabilizing posts 18 provide lateral and longitudinal stability, by acting as a stability triangle (in combination with the support post 16), as illustrated in FIG. 4. This allows the headrest cushion 12 to provide support across its surface. Second, the stabilizing posts 18 compress to provide a custom angle of the headrest cushion 12 relative to the support post 16. This allows the housing plane to tip downward (i.e. toward the base 20) about the support post 16 so as to cushion the head of the user 26, as illustrated in FIG. 1. In some embodiments, the housing plane may also tip upward by an elongating of the stabilizing posts 18. Third, the stabilizing posts 18 keep the head segment 74 of the support post 16 oriented correctly within the J-shaped track 88 to allow for easy transitions between the two positions.

In embodiments of the invention, the stabilizing post 18 comprises a shock absorber 94. The shock absorber 94 is a mechanical, hydraulic, or pneumatic device that is configured to absorb or dampen the shock applied to it. The shock absorber 94 may utilize a spring, a cushion, or a viscous fluid for absorbing the energy. It should be noted that in the invention, this energy can come from above or below. For example, the shock absorber 94 will absorb energy imparted on it from the user 26 placing their head against it from above, from turbulence imparted on the armrest 22 from below, etc. Components of the shock absorber 94 include a piston 96 and a tube 98. The viscous liquid, spring, or other shock-absorbing substance is disposed within the tube 98. The piston 96 is at least partially disposed within the tube 98. The piston 96 is allowed to move freely in and out of the tube 98, but such movements are retarded by the viscous fluid. Further, the tube 98 is enclosed so as to prevent the leaking of the viscous fluid.

Figure 16:
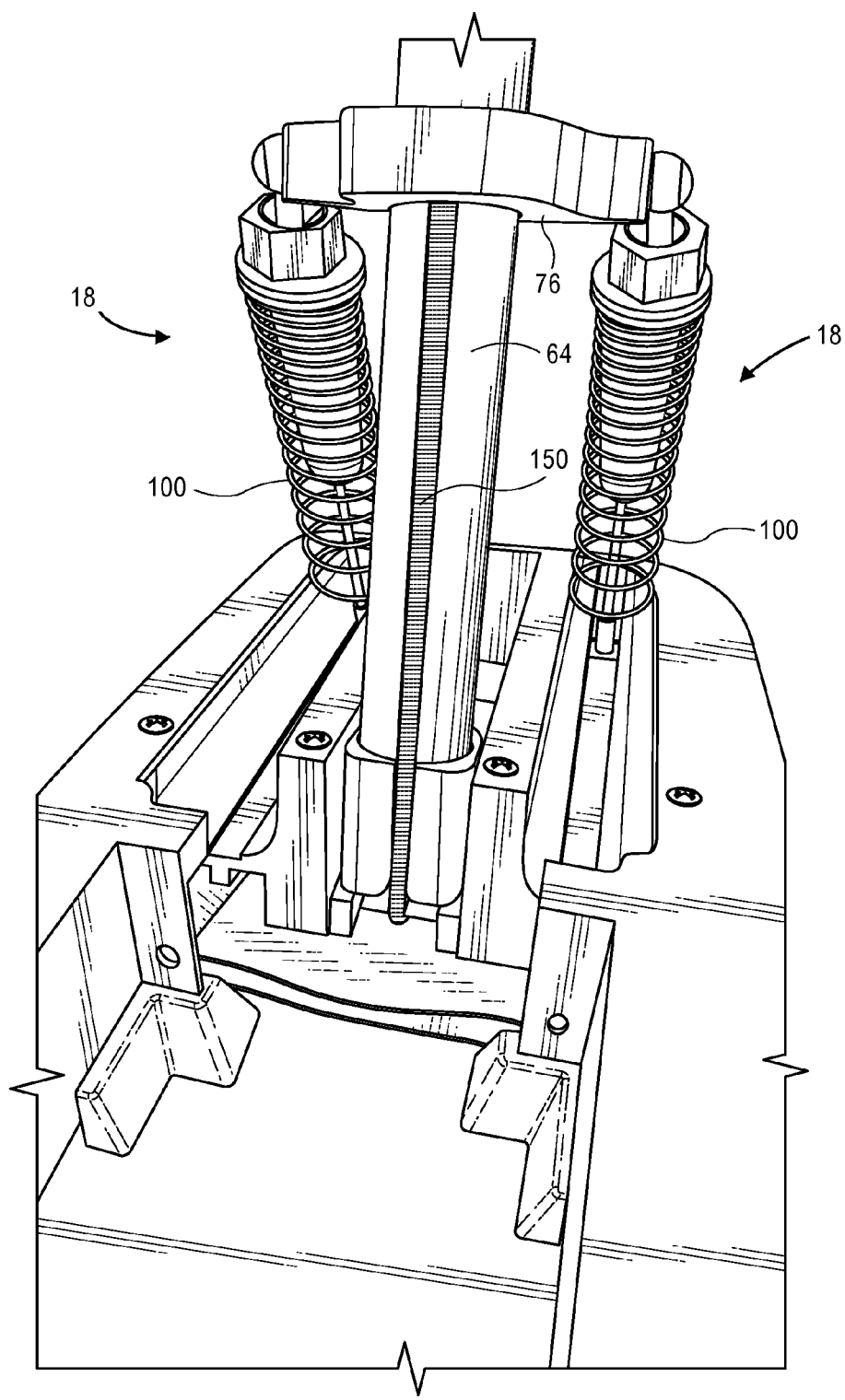
FIG. 16 is a perspective view of the compact body support apparatus, specifically illustrating a transition-assist band.

The shock absorber 94 may further include an actuator 100, such as a spring, as illustrated in FIGS. 2 and 16. The actuator 100 applies a force in a direction to provide for the shock absorber 94 to favor an elongated configuration. The actuator 100 forces the piston 96 away from the tube 98. This keeps the housing 14 and the headrest cushion 12 substantially level unless and until an even greater force is applied to the shock absorber 94 by the head or other body part of the user 26.

In embodiments of the invention, the actuator 100 assists in keeping the compact body support apparatus 10 in the collapsed position. This is because the actuator 100 places a force on a portion of the housing 14 when in the collapsed position. This force keeps the support post 16 and the stabilizing post 18 from falling out of the bottom of the housing 14. In these embodiments, the user 26 releases the compact body support apparatus 10 from the collapsed position by overcoming the force applied by the actuator 100 so as to reduce the length of the stabilizing segment. This allows the stabilizing posts 18 and the support post 16 to pivot out of the housing 14.

Figure 18:
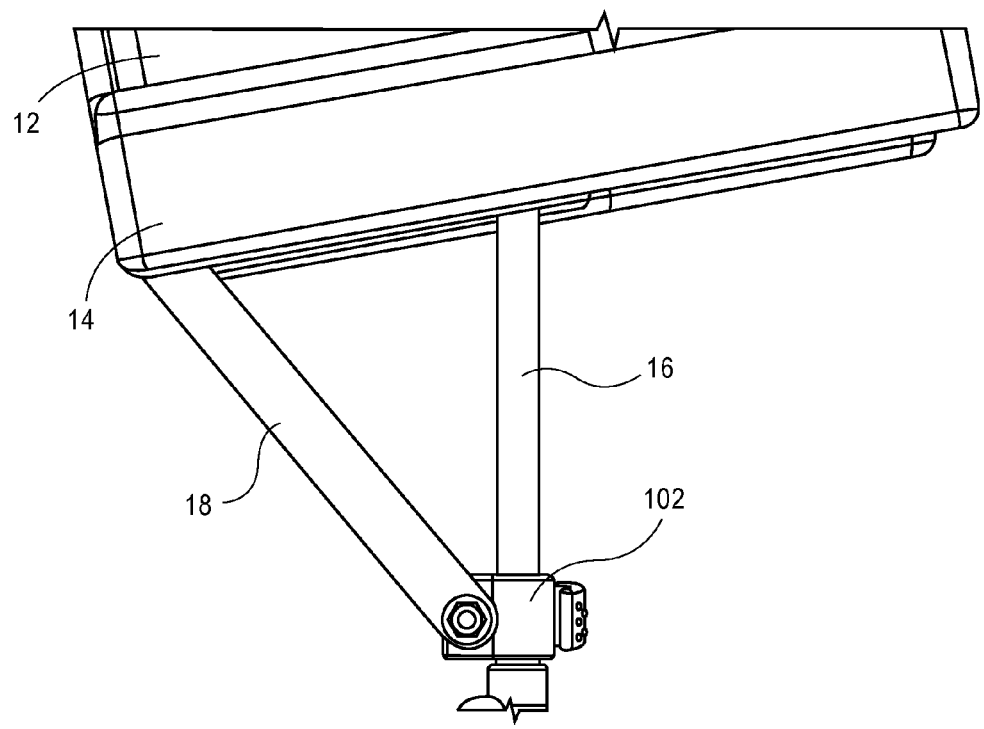
FIG. 18 is a perspective view of an alternative embodiment of a stabilizing post and a stabilizer interface.

In other embodiments of the invention, the stabilizing posts 18 are rigid (i.e. non-telescoping), as illustrated in FIG. 18. Additional customization is provided by allowing the stabilizer interface 76 of the support post 16 to slide up and down on the support post 16, raising or lowering their intersection and subsequently modifying the angle of the headrest cushion 12 relative to the head of the user 26, as illustrated in FIG. 1. The stabilizer interface 76 may be held in place with a third locking mechanism, possibly a third telescope lock 102 as illustrated in FIG. 18, until the user 26 desires to adjust the cushion angle.

The housing 14 of the compact body support apparatus 10 will now be discussed in more detail. As discussed above, the housing 14 generally includes the base-storage end 92 and the post-storage end 90. The housing 14 comprises a housing body 104 and a channel segment 106.

In embodiments of the invention, the channel segment 106 is disposed within and secured to the housing body 104. In other embodiments, the channel segment 106 and the housing body 104 are monolithic. Typically, the channel segment 106 provides for more structural stability and strength than the housing body 104. This is because the weight applied to the compact body support apparatus 10 is supported directly in the channel segment 106. In embodiments of the invention, the channel segment 106 includes, a first stabilizer channel 108, a second stabilizer channel 110, and a support channel 112 with the above-discussed J-shaped track 88 disposed therein. It should be appreciated that while the J-shaped track 88 is referred to in the singular, there are (in embodiments of the invention) a J-shaped track 88 on each side of the support channel 112. The J-shaped track 88 presents a curved end 114 and a straight end 116. The curved end 114 is disposed toward the center of the housing 14. The straight end 116 is disposed toward the post-storage end 90. It should also be noted that the above-discussed first location 84 is at the curved end 114 and the second location 86 is at the straight end 116. The curved end 114 detents to keep the head segment 74 secured in the deployed position until manipulated by the user 26. Further, the head segment 74 can pivot within the curved end 114, such that the support post 16 can be disposed at various angles relative to the housing 14.

The channel segment 106 may also include a plurality of fastener receptors 118 for the receipt of fasteners. Typically, the support channel 112 is disposed between the first stabilizer channel 108 and the second stabilizer channel 110. The channel segment 106 may include a plurality of walls 120 separating the various channels and separating the housing body 104. In other embodiments, the channel segment 106 presents a single large channel (not illustrated) into which the various supports are disposed. In these embodiments, the head segment 74 of the support post 16 may present a wide crosspiece so as to interface with the J-shaped track 88 on either side of the large channel.

Figure 6:
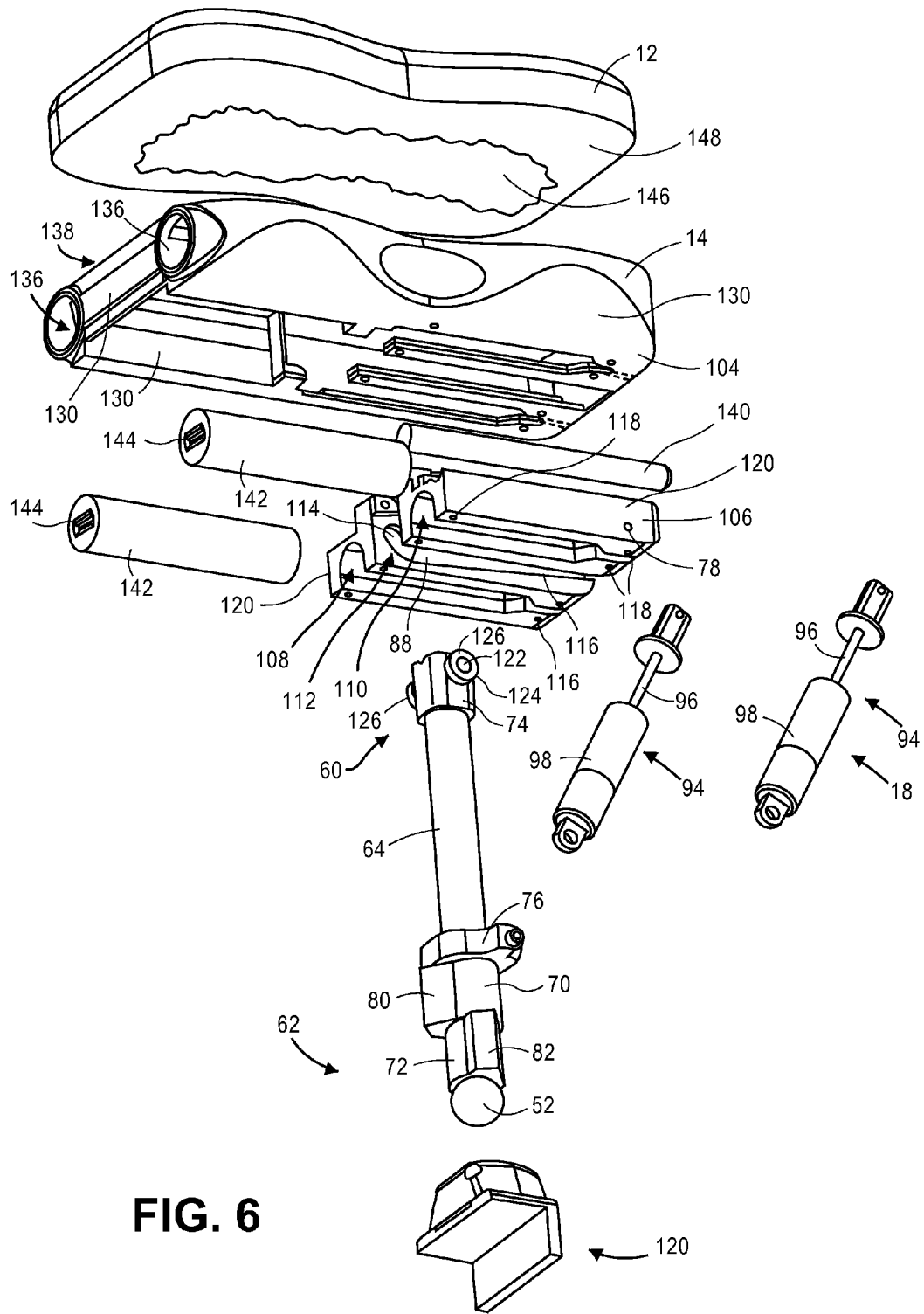
FIG. 6 is an exploded view of the compact body support apparatus.
Figure 7:
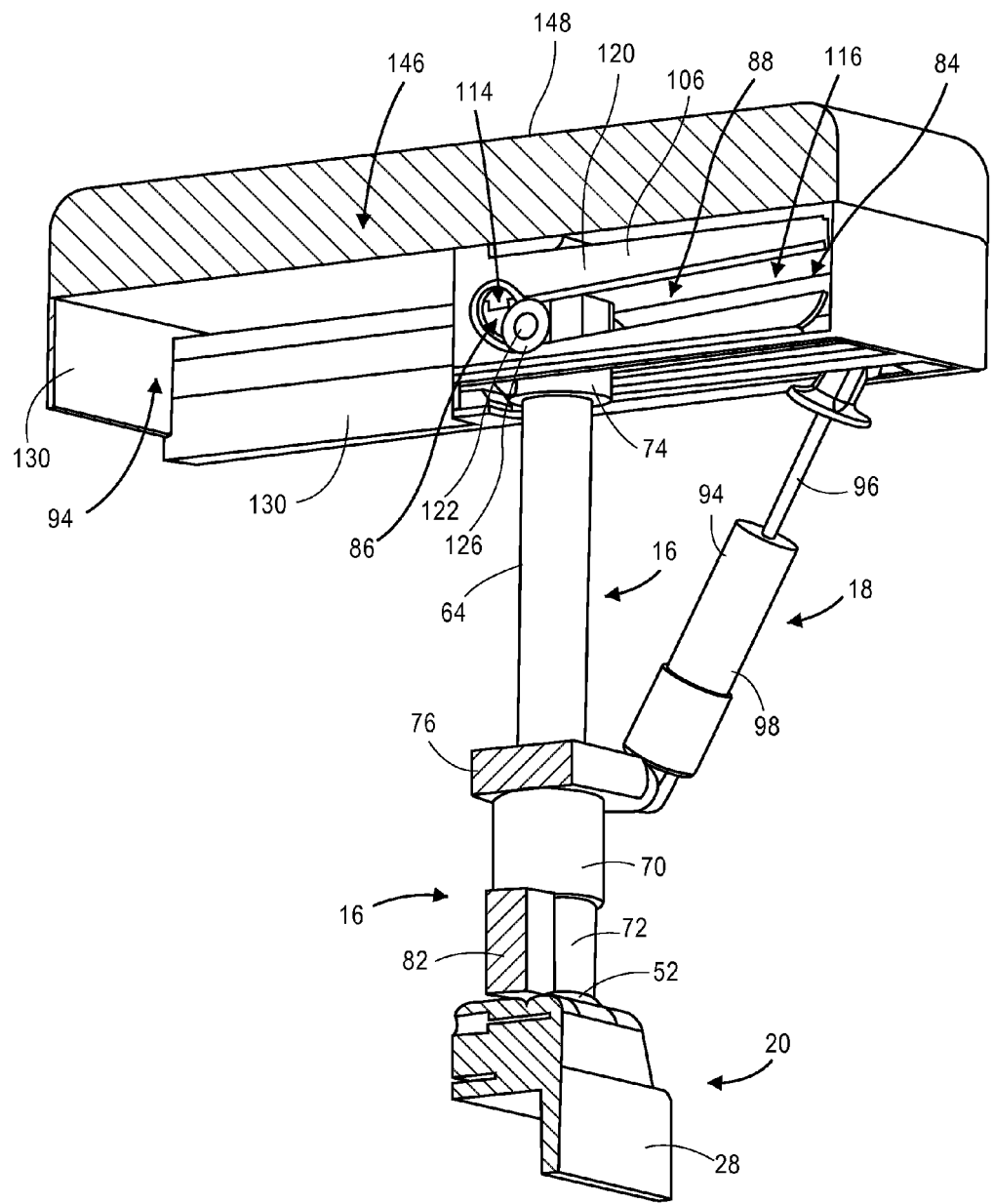
FIG. 7 is a vertical cross-sectional view, through the 7-7 line of FIG. 8, specifically illustrating a J-shaped track.

The interaction between the J-shaped track 88 and the head segment 74 of the support post 16 will now be discussed in greater detail. The head segment 74 of the support post 16 includes a crosspiece 122 and a slide segment 124. The crosspiece 122 extends laterally from the head segment 74. When installed in the J-shaped track 88, the crosspiece 122 extends into at least a portion of the J-shaped track 88 on each side. A slide segment 124 is disposed at each end of the crosspiece 122. The slide segment 124 is therefore disposed within the J-shaped track 88 on each side. The slide segment 124 may include a roller 126, as illustrated in FIGS. 6 and 7, a friction-reducing substance, ball bearings, or the like. The roller 126 is rotatably secured to the crosspiece 122 so as to assist the head segment 74 is moving between the first location 84 and the second location 86. The friction-reducing substance may also be disposed within the J-shaped track 88. The sliding action of the head segment 74 within the J-shaped track 88 allows the compact body support apparatus 10 to both provide support for the user 26 and compactly collapse within the housing 14. When in the collapsed position, it is advantageous to position the head segment 74 at or near the post-supporting end of the housing 14 so the support post 16 can be relatively long (i.e. slightly shorter than housing 14 along the lateral direction when in the minimal distance configuration). When in the deployed position, it is advantageous to position the head segment 74 near the center of the housing 14 such that it provides approximately central and uniform support for the user 26.

Figure 8:
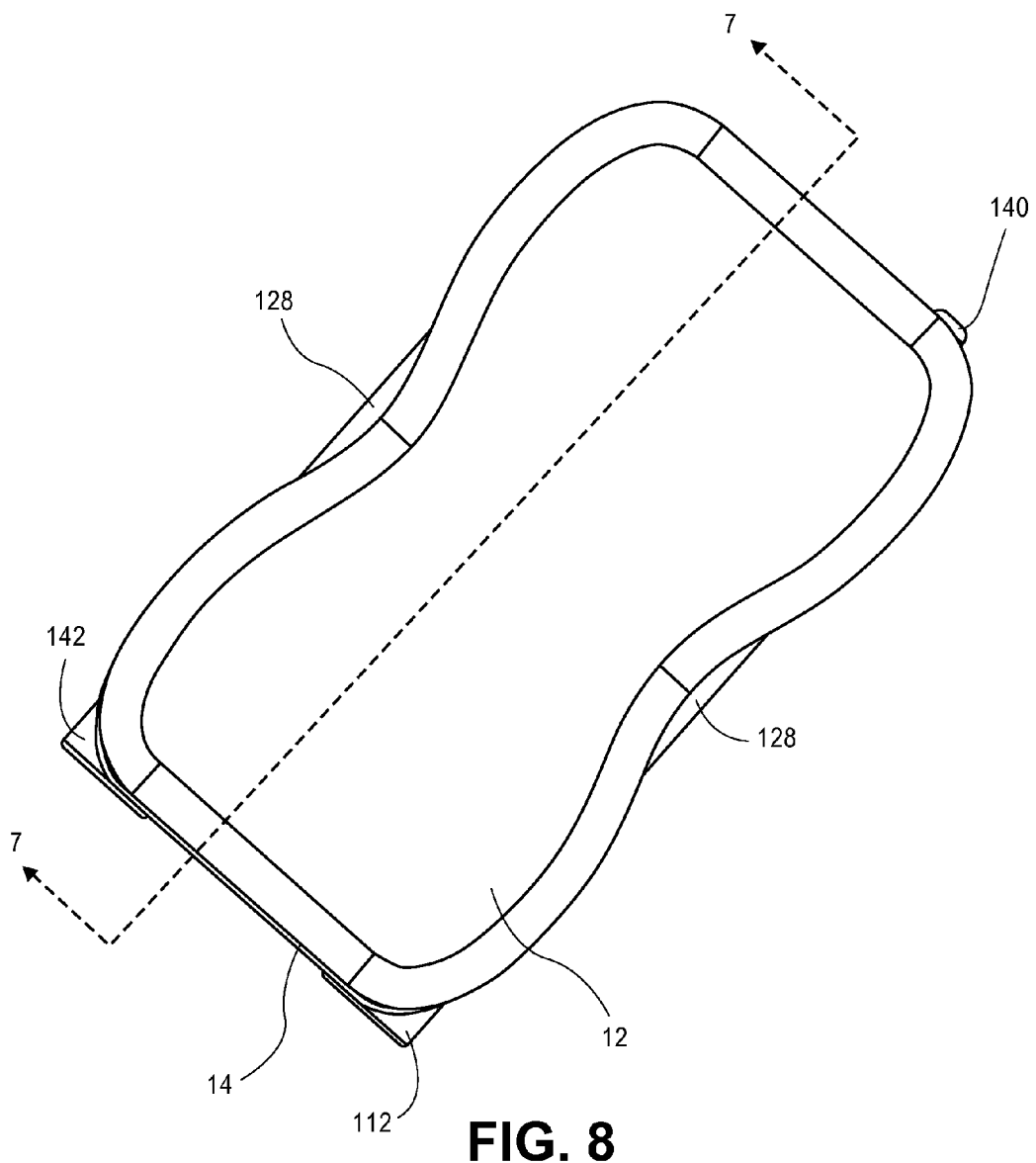
FIG. 8 is a top view of the compact body support apparatus.

In embodiments of the invention, the housing body 104 is generally a rectangular prism, as best illustrated in FIGS. 8 and 9. The housing body 104 provides for protection for the components therein, support for the headrest cushion 12, etc. The housing body 104 and/or the headrest cushion 12 may present a general figure "8" shape when viewed from above, as illustrated in FIG. 8. This shape allows for the user 26 to grasp the housing 14 and the headrest cushion 12 about two opposing depressions as viewed from above. This allows a large cushion area while still allowing the user 26 to easily grasp the compact body support apparatus 10.

As shown in FIGS. 8-10, when the compact body support apparatus 10 is the collapsed position, the housing 14 serves as an aesthetically pleasing and durable outer casing that encloses and protects the base 20, the support post 16, the stabilizing posts 18, and any other components of the head support apparatus. The minimum length of the support post 16 may be designed such that the horizontal segment 30 and/or vertical segment 28 of the L-shaped base 20 integrates with an outer wall 130 of the housing 14 at the base-storage end 92 to complete the above-discussed encasing. In some embodiments, the support post 16 and/or L-shaped base 20 may snap into place to maintain the collapsed position until further use is desired. When in its completely collapsed form, the structure may appear nearly seamless, with few to no extruding parts. The housing 14 may also present at least one handgrip 128 that protrudes from the housing so as to aid in the user 26 gripping the housing 14.

In some embodiments, moving the compact body support apparatus 10 from the collapsed position to the deployed position requires an action to disengage the support post 16 and/or stabilizing post support from a locked-in position, such as via the release of a snap or depression of a button (not illustrated). The stabilizing posts 18 remains statically jointed to the housing 14, while the end of the support post 16 is free to slide down the J-shaped track 88 illustrated in FIG. 10 from the first location 84 near the outer wall 130 of the housing. The sliding end of the support post 16 snaps or otherwise locks into the second location 86 at the curled end of the J-shaped track 88 to provide structural support while the compact body support apparatus 10 is in use. In some embodiments the physical structure of the J-shaped track 88 and/or joints may differ, but typically at least one static end and at least one moving end are utilized.

In some embodiments of the invention, the housing 14 presents a plurality of openings 132. In some embodiments, the plurality of openings 132 includes a stylus opening 134, a battery pack opening 136, and a general-purpose pocket 138. Each of the plurality of openings 132 in the housing 14 allow for other objects to be inserted therein for easy storage.

In embodiments of the invention, the stylus opening 134 is disposed at the post-storage end 90 of the housing 14. The stylus opening 134 is oriented substantially parallel to the housing 14 plane and substantially parallel to the orientation of the support post 16 within the housing 14. In some embodiments, the stylus opening 134 includes a stylus 140. The stylus opening 134 may additionally include a cover (not illustrated), such as if the stylus 140 is not included with the compact body support apparatus 10.

The stylus 140 may be used by the user 26 in conjunction with a smart phone, tablet computer, laptop computer, or the like. The stylus 140, being disposed within the compact body support apparatus 10 is conveniently located for the use of the user 26. For example, the user 26 may typically remove the compact body support apparatus 10 from their luggage for the duration of the flight, train trip, etc. This means that the user 26 will already have removed their stylus 140 and will not have to independently remember it. To remove the stylus 140 from the stylus opening 134, the user 26 may manually pull the stylus 140, push the stylus 140 in such that an actuator 100 will eject the stylus 140 (not illustrated), push the stylus 140 out from the interior of the housing 14, or the like.

In embodiments of the invention, the battery pack opening 136 is disposed at the base-storage end 92 of the housing 14. In some embodiments, there are two battery pack openings 136 disposed on either lateral side of the base-storage end 92. This provides for a symmetrical aesthetic appearance and a symmetrical weight (when a set of battery packs 142 are disposed therein). Like the stylus opening 134, the battery pack opening 136 is oriented substantially parallel to the housing plane and substantially parallel to the orientation of the support post 16 within the housing 14. The battery pack openings 136 may also include a cover (not illustrated), such as if the battery pack 142 is not included with the compact body support apparatus 10. In some embodiments, the cover may be selectively removed and added over the battery pack 142 so as to prevent damage and foreign substances from entering the battery pack 142. In some embodiments, the a storage container (not illustrated) may be disposed in the battery pack opening 136 in lieu of the batter pack 142. In some of these embodiments, the user 26 may select what, if any, item will be in the battery pack opening. For example, if the user 26 does not have a use for a battery pack 142, the user 26 may instead dispose a storage container in the battery pack opening 136.

The battery packs 142 can perform any or all of various functions. First, the battery packs 142 may provide charging power to external devices. The battery packs 142 of these embodiments may include a USB port 144. The USB port 144 allows for the user 26 to plug a USB cable into the battery pack 142 to charge their smart phone, tablet computer, powered headphones, digital music player, gaming device, electronic readers, or the like. The battery pack 142 is charged via an external power source (not illustrated). For example, the battery pack 142 may be externally charged via a USB-power cable that is plugged into the USB port 144 of the battery pack 142. The battery pack 142 may also be removable such that it can be easily recharged or replaced upon the battery pack 142 losing charge capacity.

Second, in some embodiments of the invention, the battery packs 142 can be utilized to provide electrical power within the compact body support apparatus 10. In one embodiment, the electrical power is utilized to power an electrical massager (not illustrated) within the compact body support apparatus 10. The electrical massager is disposed within the headrest cushion 12, or between the headrest cushion 12 and the housing 14. The electrical massager provides a gentle and comfortable vibration to the head of the user 26. In another embodiment, the electrical power is utilized to power an internal speaker (not illustrated). This internal speaker is disposed within the headrest cushion 12 and/or the housing 14. The internal speaker is similar to a headphone speaker, such that the noise produced thereby is only easily heard by a person having their head against the headrest cushion 12. The internal speaker may include an audio input connection, such that the user 26 can supply music or spoken word to the speaker from an external device, such as a smart phone or digital music player. Additionally, or in the alternative, the internal speaker may provide white noise, active noise cancellation, or other sleep-inducing sounds without an input from an external device. In still another embodiment, the electrical power is utilized to power a flashlight, which may be disposed within the battery pack opening 136 and oriented outward. This allows the user 26 to conveniently illuminate a reading material while having their head emplaced on the compact body support apparatus 10. In still other embodiments, not illustrated, the battery pack 142 could be used to power a fan, to power a heating device, and/or to power a cooling device. In some embodiments, the various devices discussed above are customizable to the user 26, such that the user can select which (if any) of the devices to dispose within the compact body support apparatus 10. For example, the user 26 may select to have one battery pack 142 with a USB port 144 and one battery pack with a heating device (not illustrated).

Third, in some embodiments of the invention, the battery packs 142 can be utilized to deploy the compact body support apparatus 10. In these embodiments, the user 26 presses a button or provides another input that the user 26 desires to move the compact body support apparatus 10 between positions. For example, the user 26 may press a button on the head support apparatus to move the compact body support apparatus 10 to the deployed position. An electronic motor (not illustrated) then powers an actuator 100 to push the head segment 74 into the curved end 114 of the J-shaped track 88.

The general-purpose pocket 138 provides for convenient storage for various external objects. Typically, the general-purpose pocket 138 is typically a slit between the headrest cushion 12 and the housing 14 or within the headrest cushion 12. In some embodiments of the invention, the general-purpose pocket 138 is configured to receive small and/or thin objects, such as passports, identification cards, credit cards, boarding passes, money. In some embodiments, the general-purpose pocket 138 is configured to receive larger objects such as a wallet, a cell phone, a gaming device, snack food, a small book, etc. In these embodiments, the compact body support apparatus 10 can serve as the entirety of the carry-on luggage for the user 26. This provides convenience for the user 26. The general-purpose cover may include a zipper, a button, or other enclosing structure to securely retain the objects therein.

The headrest cushion 12 is disposed atop the housing 14. The headrest cushion 12 presents the general figure "8" shape that is similar to the shape presented by the housing 14, as illustrated in FIG. 8. The headrest cushion 12 is formed of a cushion member 146 for comfortably supporting the head, neck, or other body part of the user 26. The cushion member 146 may be formed of foam, gel, or similar materials. The headrest cushion 12 may include an outer cover 148 that is selectively removable by the user 26. This allows the user 26 to wash the outer cover 148 and replace the outer cover 148 upon it becoming worn or the like. The outer cover 148 may also be customizable and include information such as the manufacturer, the user 26, an organization associated with the user 26, etc.

In some embodiments, the headrest cushion 12 is secured to the housing 14 via the outer cover 148. The outer cover 148 interfaces with a portion of the housing 14, such as a cap piece, not illustrated, to hold the outer cover 148 in position relative to the housing 14. As the headrest cushion 12 is disposed between the outer cover 148 and the housing 14, the headrest cushion 12 is secured in place. In these embodiments, the headrest cushion 12 may be removable from the housing 14 for cleaning and customization purposes. For example, the compact body support apparatus 10 may be provided with headrest cushions 12 of various softness versus firmness, materials, etc. This allows the user 26 to select a headrest cushion 12 that is the most comfortable to them. In some embodiments, the headrest cushion 12 is disposable, such that the user 26 may discard the headrest cushion 12 upon it becoming worn and acquire a replacement.

In some embodiments, a transition-assist band 150 is utilized to assist transitions between the deployed position and the collapsed position (and vice versa), as illustrated in FIG. 16. The transition-assist band 150 is disposed partially with in the housing 14. The transition-assist band 150 is an elastic band that is secured at one end to the head segment 74 of the support post and at a second end to the stabilizer interface 76 of the support post 16. The transition assist band is routed through a cross-post 152 of the housing. The transition-assist band 150 applies a force that pulls the support post 16 from the deployed position (once the user 26 moves the head segment 74 into a portion of the straight segment of the J-shaped track 88) to the collapsed position. So, as the user 26 pulls downward on the support post 16 to overcome the curved end 114 of the J-shaped track 88, the transition-assist band 150 then pulls the compact body support apparatus 10 closed. As such, the transition-assist band 150 is at maximum stretch when the support post 16 is disposed at approximately a 45 degree angle relative to the housing plane.

In other embodiments of the invention, the housing 14 and/or the headrest cushion 12 presents another shape other than the general figure "8" shape when viewed from above. For example, the housing 14 and/or the headrest cushion 12 may present a rectangle, a square, a circle, an ellipse, a U-shape, a J-shape, an arcuate shape, an annular shape, or the like.

In other embodiments, the compact body support apparatus 10 comes in a variety of sizes. For example, the compact body support apparatus 10 may come in an extra-large size for users 26 needing additional height or weight accommodation. As another example, the compact body support apparatus 10 may come in a child size for users needing less height and weight accommodation. In these embodiments, the compact body support apparatus 10 may appear and operate generally similar but of a different scale in physical dimensions.

In other embodiments, the compact body support apparatus 10 is designed for use by a chiropractor, masseuse, or similar person. In these embodiments, the user 26 is the patient or customer. The compact body support apparatus 10 may include the headrest cushion 12 of a size and shape to accommodate the user 26 laying their head forward. This may include openings or depression for the mouth and nose.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. A compact body support apparatus comprising:
a base configured to interface with a seat of a vehicle;
a support post presenting a lower end secured to the base and an upper end;
a housing pivotably secured to the upper end of the support post; and
a headrest cushion secured to the housing for supporting a body part of a user,
wherein the compact body support apparatus is configured to be selectively placed into a collapsed position and a deployed position,
wherein the support post and at least a portion of the base are disposed within the housing when the compact body support apparatus is in the collapsed position,
wherein the support post extends in a generally downward direction when the compact body support apparatus is in the deployed position,
wherein the upper end of the support post is disposed in a first location of the housing when in the collapsed position and disposed in a second location of the housing when in the deployed position.

2. The compact body support apparatus of claim 1, wherein the housing presents a J-shaped track.

3. The compact body support apparatus of claim 2, wherein said first location is at a straight end of the J-shaped track, wherein said second location is at a curved end of the J-shaped track.

4. The compact body support apparatus of claim 2, wherein at least a portion of a head segment of the support post is disposed within the J-shaped track of the housing, wherein the head segment is configured to slide along the J-shaped track whilst moving between the collapsed position and the deployed position.

5. The compact body support apparatus of claim 1, further comprising—
at least one stabilizing post secured at an upper end to the housing and secured at a lower end to the support post.

6. The compact body support apparatus of claim 5, wherein the at least one stabilizing post includes a shock absorber.

7. The compact body support apparatus of claim 1, wherein the support post includes a static segment and a first telescoping segment,
wherein the first telescoping segment of the support post is configured to telescope within the static segment.

8. The compact body support apparatus of claim 7, wherein the support post further includes a second telescoping segment,
wherein the second telescoping segment of the support post is configured to telescope within the first telescoping segment.

9. The compact body support apparatus of claim 1, wherein the housing includes—
a battery pack opening; and
a battery pack disposed in the battery pack opening, wherein the battery pack is configured to provide electrical charging power to an external device.

10. The compact body support apparatus of claim 1, wherein the headrest cushion includes a removable cover and a removable cushion.

11. The compact body support apparatus of claim 1, wherein the headrest cushion and the housing present a general figure "8" shape when viewed from above.

12. A method of mounting a compact body support apparatus, the method comprising the following steps:
acquiring a compact body support apparatus including a base, a support post, a housing, and a headrest cushion,
wherein the compact body support apparatus is disposed in a collapsed position such that the support post and a least a portion of the base are disposed within the housing;
grasping the base of the compact body support apparatus;
pulling the base away from the housing, such that the support post secured thereto pivots out of the housing;
continuing to pull the base away from the housing until the compact body support apparatus is in a deployed position; and
placing the base against a portion of a vehicle.

13. The method of claim 12, further including the step:
adjusting a length presented by the support post to a desired length.

14. The method of claim 12, further including the following steps:
pulling downward on the support post so as to release the support post from a first position near a center of the housing;
sliding the support post along a J-shaped track toward a second position near a post-storage end of the housing;
securing the support post within the housing so as to return the compact body support apparatus to the collapsed position.

* * * * *